Sept. 17, 1963

N. S. ZIMBEL 3,104,379

ELECTRICAL APPARATUS

Filed Nov. 12, 1958

3 Sheets-Sheet 1

INVENTOR.
NORMAN S. ZIMBEL

BY Henry L. Hanson

ATTORNEY

Sept. 17, 1963 N. S. ZIMBEL 3,104,379

ELECTRICAL APPARATUS

Filed Nov. 12, 1958 3 Sheets-Sheet 2

INVENTOR.
NORMAN S. ZIMBEL

BY Henry L. Hanson

ATTORNEY

INVENTOR.
NORMAN S. ZIMBEL
BY Henry L. Hanson
ATTORNEY

United States Patent Office 3,104,379
Patented Sept. 17, 1963

3,104,379
ELECTRICAL APPARATUS

Norman S. Zimbel, Auburndale, Mass., assignor to Minneapolis-Honeywell Regulator Company, Minneapolis, Minn., a corporation of Delaware Filed Nov. 12, 1958, Ser. No. 773,374
8 Claims. (Cl. 340—174)

A general object of the present invention is to provide a new and improved electrical apparatus for the storing and transfer of digital data. More specifically, the present invention is concerned with a new and improved data storage transfer circuit of the type utilizing electrical storage elements arranged in a matrix configuration wherein the matrix has been divided into a plurality of levels such that data may be moving into one level of the matrix and out of another level of the matrix at the same time.

Data in digital data processing systems or apparatus is generally in the form of electrical pulses whose presence or absence may define, in binary terms, selected combinations of data. In processing digital data in certain types of data processing systems, it is necessary that there be provided buffer circuits connected between certain component combinations of the system, particularly where there is a difference in the speed of operation of the components being connected. For example, a high speed electronic computing circuit may be working in combination with some relatively slow speed storage mechanism, such as a magnetic drum, a magnetic tape apparatus, or the like. In order to utilize a high speed computing apparatus with such a low speed storage device, a buffer mechanism is provided which serves to effectively change the speed of operation or manipulation of the data as it is transferred from one portion of the apparatus to the other. For example, the data coming from a high speed electronic computing apparatus may be coupled to the buffer at a very high transfer rate with the bits being inserted into the buffer at electronic speeds in the microsecond range. The data going out of the buffer to a storage mechanism may well be going out at a much lower speed depending upon the speed of operation of the storage device, and the speed here may well be in the millisecond range. Thus, the buffer must be able to accept and discharge data at different speeds.

In order that such a buffer circuit may be increased in its utility, it is desirable that data transfer into the buffer be allowed at the same time that data is being transferred out of the buffer without any interference between the two operations. This has been achieved in the present invention by a unique arrangement of a plurality of electrical data storage elements in a matrix wherein this matrix is divided into a plurality of separate levels which have certain common selection lines which can be operated in both levels of the buffer without creating any problems of interference between an input and an output transfer from the buffer.

It is therefore a further more specific object of the present invention to provide a new and improved matrix type buffer circuit wherein said circuit is divided into a plurality of levels, at least one level of which may be used for accepting information into the buffer, and at least one additional level which may be used for transferring data out of the buffer.

A further more specific object of the invention is to provide a new and improved buffer circuit of the matrix type wherein data may be transferred in and out of the buffer simultaneously.

Another feature of the present invention lies in the interlocking arrangement which insures that when a reading operation is taking part in the one level of the buffer circuit, a writing operation may be taking place in another part of the circuit. An appropriate interlock is achieved by the use of appropriate commutating circuits having electrical interlocks which insure that the circuit may operate simultaneously in two levels in the buffer circuit so long as the operations in the two levels are of an opposite sense, namely, a reading sense and a writing sense.

A further object of the invention is then to provide a new and improved buffer circuit having appropriate electronic interlocks which permit the circuit to effect a simultaneous reading and writing in the buffer circuit without interference between the two operations.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
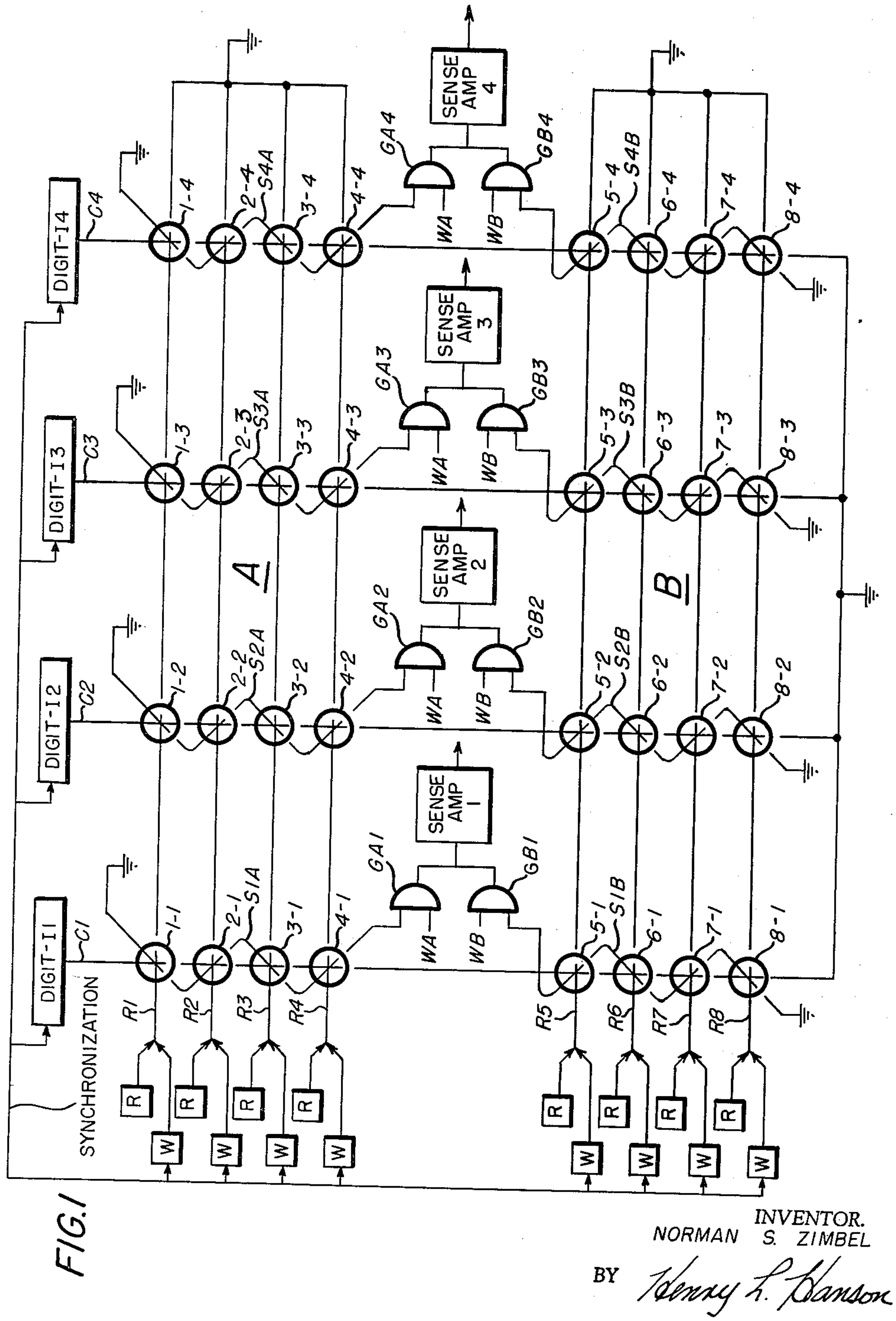
FIGURE 1 is a diagrammatic representation of a buffer circuit used in accordance with the principles of the present invention.

Referring first to FIGURE 1, the present buffer circuit is shown in representative form and will be seen to comprise a plurality of electrical storage elements arranged in rows and columns to form a matrix. The storage elements are identified by their row and column position in the matrix with the first number designation representing the row and the second number designation representing the column. Thus, there are eight rows and four columns, with the storage elements being identified by the numbers 1–1 through 8–4.

The storage elements in this matrix circuit may well be formed of bistable core elements which have substantially rectangular hysteresis characteristics. When such core elements are arranged in a matrix configuration as herein illustrated, they may be considered as forming a "linear selection" circuit wherein certain operations performed within the matrix depend upon there being a selection current on the selection line associated with each row of elements. The information written into these elements depends upon the linear selection and the information content of the digit control drives.

The column selection lines for this matrix are identified as column one selection line C1, column two selection line C2, column three selection line C3, and column four selection line C4. The row selection lines for the matrix are identified as the row lines R1 through R8.

The matrix circuit illustrated in FIGURE 1 may be considered as being divided into two levels, an A level and a B level. Associated with each column for each level is a separate sense line. Thus, there are four sense lines in the A level, S1A, S2A, S3A, and S4A. Similarly, the B level of the buffer has a separate sense line for each column in that segment of the buffer circuit and these sense lines are identified as S1B, S2B, S3B, and S4B.

Four utilization circuits in the form of sense amplifiers are shown in the combination. In actual practice, the sensed amplified output signals will be further utilized at their ultimate destination. The inputs to each of the sense amplifiers comprise a pair of gating circuits. The gating sections associated with the A level of the buffer matrix are identified as GA1 through GA4. Gating sections associated with the B level of the buffer are identified as GB1 through GB4. These gating sections have as one input the associated sense line and a further input relating to whether the data stored in the A section is to be sensed or the data stored in the B section is to be sensed. These further inputs are identified as WA and WB and provide mutually exclusive activating signals, as discussed hereinbelow in connection with FIGURE 4.

Associated with each of the row selection lines R1 through R8 is an associated reading signal source R and a writing signal source W. The signal derived from the reading sources R will be a negative signal of sufficient magnitude to switch any core of the corresponding row from a set state to a reset state. The output signal from the writing signal sources W will be a positive signal of sufficient magnitude to switch any core in the reset state to the set state in the absence of some other inhibiting signal on the associated core.

Associated with each of the column select lines C1 through C4 are digit inhibit signal sources I1 through I4. The signal from these sources will be a negative signal of approximately half the amplitude of the signal received from the write signal sources W and will be synchronized with the latter signal, as schematically indicated by the broken-line connection in FIGURE 1. Thus, the presence of this negative signal will tend to inhibit the effect of any write signal received from the sources W.

Figure 2:
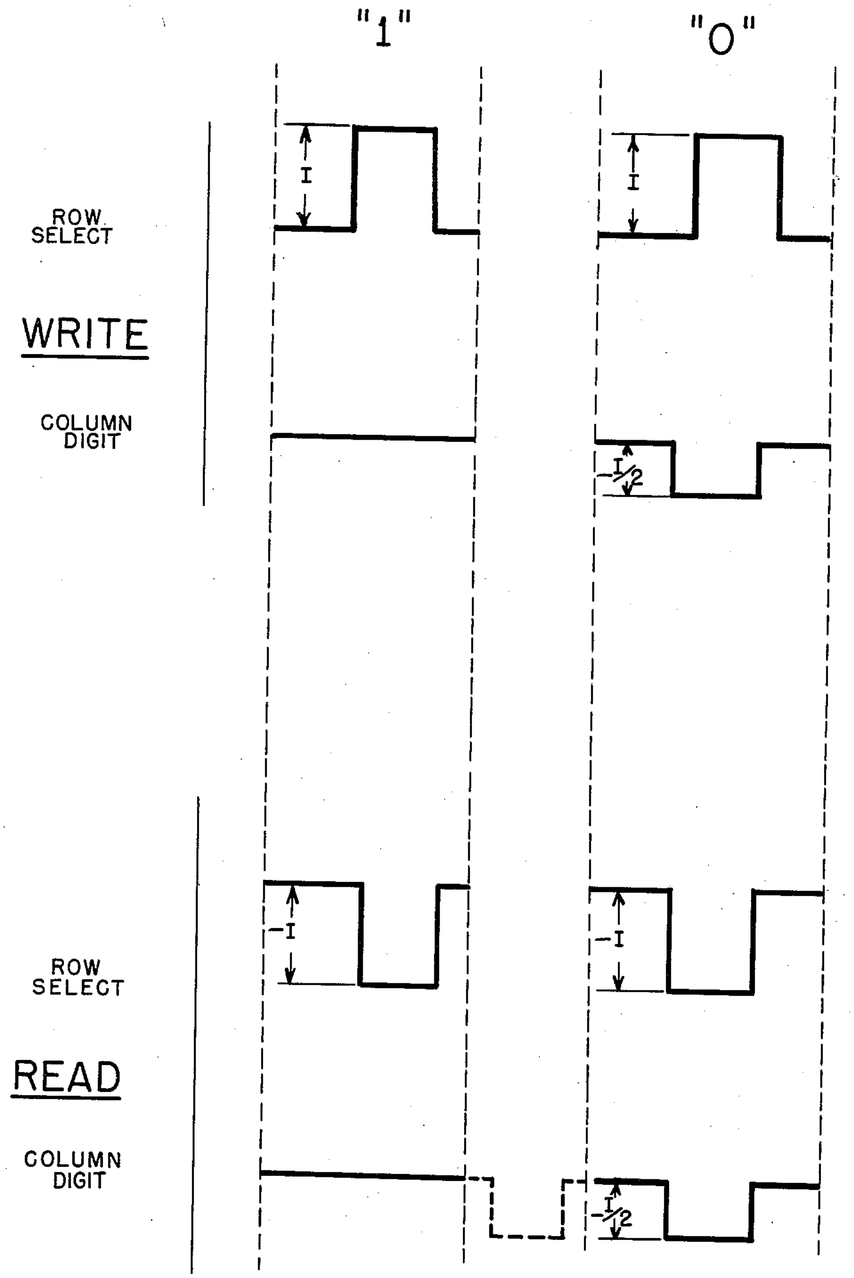
FIGURE 2 illustrates representative wave forms associated with the circuit of FIGURE 1.

In considering the operation of the circuitry of FIGURE 1, it is first assumed that all of the storage elements 1–1 through 8–4 are in the reset state and that no data has been written into the matrix in either the A level or in the B level. Under these conditions, the matrix will be in a condition to receive data from the input. As arranged in the illustrated circuit, the data is adapted to be written into the matrix by way of the digit inhibit sources by a parallel write-in. Since there are four digit sources, it is possible to insert four digits during a particular writing operation. In order to effect a write-in into the first row, the row selection line R1 will have a positive pulse supplied thereto as indicated in FIGURE 2. As pointed out above, the magnitude of this write signal will be such that each of the storage cores 1–1 through 1–4 will tend to be switched into the set state. If the digit to be written into the core 1–1 is a "one," there will be no inhibit signal applied to the column selection line C1. If the digit to be written into the core 1–2 is a "zero," the column selection line C2 will have an inhibit signal applied thereto in the manner indicated in FIGURE 2. This signal will eliminate or cancel out the effect of the switching signal on the row line R1 such that the core 1–2 will remain in the reset state. If a "one" is to be written into the core 1–3, there will be no signal applied to the column selection line C3 so that the signal on the line R1 will be effective to set the core 1–3. If a "zero" is to be written into the core 1–4, an inhibit signal will be applied to the column selection line C4. As will become clear from a consideration of the circuit of FIGURE 1, the synchronization means assures that the inhibit signals are applied to the column selection lines in time coincidence with the signals on the row selection lines.

Once four digits have been inserted into the first row of the cores 1–1 through 1–4, the circuit may be stepped so that the next insert may be on the second row, which encompasses the cores 2–1 through 2–4. Once there has been a parallel write-in to this row of cores, a further insert may be made into the third row and then a fourth write-in into the fourth row.

During the time that there is a writing operation taking place in the A level of the circuit, the gating circuits GA1 through GA4 will all be closed. Thus, there will be no information transferring to the sense amplifiers as a result of any input writing operation.

Once the A level of the buffer has been filled, the circuit may then be arranged to accept information in the B level. Thus, the digit input lines I1 through I4 may once again be used for transferring information into the next row of cores on the row selection line R5. This may be followed by an input to the cores on the selection line R6 and then on through insertion by way of the selection lines R7 and R8. Once again, during the writing operation in the B level of the buffer matrix, the gating circuits GB1 through GB4 will be closed.

During the time that a writing operation is taking place in the B section on the buffer, it is possible for a reading operation to be going on in the A level of the buffer. This will be apparent when it is noted that the reading signal applied to the row selection lines is a negative signal, as illustrated in FIGURE 2. This negative signal is of sufficient magnitude to switch any core device which is in the set state back into the reset state. Inasmuch as the switching will be taking place in one level of the buffer, it will not affect any other level of the buffer. As illustrated in FIGURE 2, even though an input inhibit signal may be originating in one of the column selection lines, this inhibit signal will be negative and will be in a direction to reinforce the selection signal made in any particular row selection line. Thus, it will not interfere with any readout of any digital data from the particular row where a readout is to take place. Further, the readout can take place at any time with respect to the presence of a write-in signal on one of the column selection lines. Whether or not the inhibit signal on a column selection line reinforces the row selection readout signal is of no consequence, since the row selection signal, by itself, is of sufficient amplitude to switch any core which has been in the set state.

If the first readout is to occur on the first row of cores 1–1 through 1–4, the row selection line R1 will have a negative signal applied thereto, and the switching of the core will induce a signal in any sense winding associated with a core where the core actually switches. The effect of this will be to transfer a signal to the gating circuits GA1 to GA4, which gating circuits will be open when it is desired to read a word from the A level of the buffer. When the gating circuits are open, the sense amplifiers 1 through 4 will have an output if the associated core was actually switched as a result of the read signal on the row selection line.

Once the first row of cores has been read, the second row of cores may be read, and this may be followed by the third and fourth rows of cores. Further, this reading operation may be going on at the same time that a writing operation is taking place in the B level of the buffer.

Once the data has been read out of the A level of the buffer, the read operation may then begin to take place in the B level of the buffer. During the time that the read operation is taking place in the B level of the buffer, the gates GA1 through GA4 will be closed and the gates GB1 through GB4 will be open. Further, while the reading operation is taking place in the B level of the buffer, a writing operation may be taking place in the A level of the buffer.

Figures 3, 4:
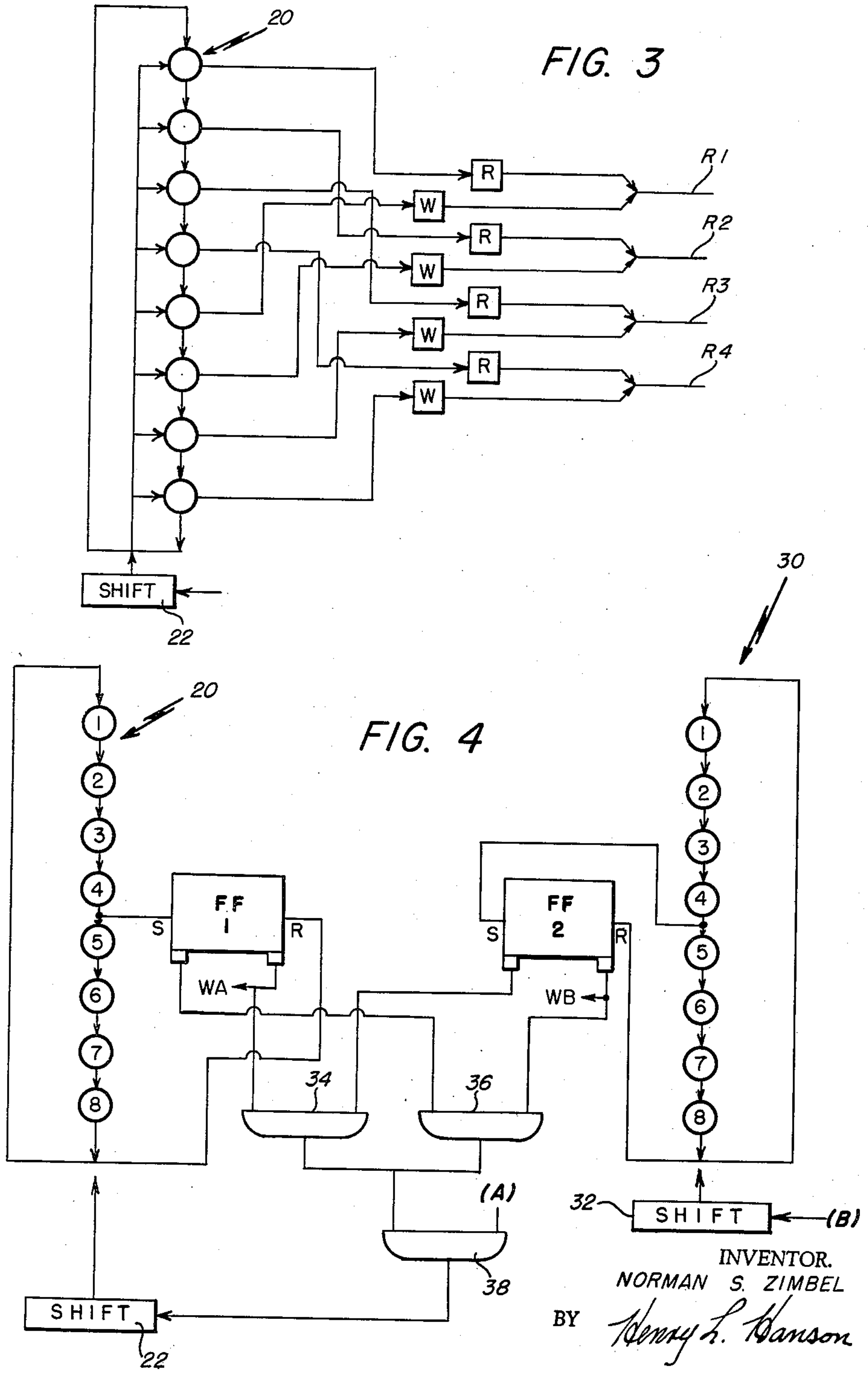
FIGURE 3 illustrates a representative form of driving circuit for the reading and writing operation in one level of the matrix buffer of FIGURE 1.
FIGURE 4 represents a form of interlocking circuit for insuring that reading and writing operations in the buffer circuit are maintained in step.

Referring to FIGURE 3, there is here illustrated a representative form of electronic commutating circuit which may be used for activating the writing and reading circuits for the respective levels of the matrix circuit of FIGURE 1. Corresponding reference designations have been retained. In this figure, there are illustrated the row selection lines R1 through R4, as well as their respective reading and writing signal sources R and W. In the normal type of circuit, although not necessarily so, the row selection lines R1 through R4 will be activated in sequence with a writing operation taking place on the four rows in sequence followed by a reading operation on the four rows, again in sequence. In order to effect the desired sequencing, a serial shift register 20 may be provided which may well take the form of a single core per bit, magnetic core type of register well known in the art. A single bit inserted in the register may be shifted serially therethrough. As connected, when the bit is shifted through the cores 5 through 8 it provides a triggering signal for the writing signal sources W. When shifted through the cores 1 through 4, it provides a triggering signal for the reading signal sources R. The shift signals may be derived from a shift signal source 22 having an input which is related to the timing required for writing information from a central data processing frame or signals relating to the reading of information to a storage medium, such as a magnetic tape or magnetic drum. Obviously, the functions may be reversed so that the write-in signals are derived from a storage medium and the readout is to a high speed computing circuit.

Referring next to FIGURE 4, there is here illustrated a representative form of interlock system which insures that the reading operation and the writing operation will not be occurring in both levels of the buffer at the same time. Corresponding reference designations have been retained. This circuit is so arranged that in the event an attempt should be made to read or write in two levels of the buffers at the same time, one of the shift signal sources will be cut off and the other allowed to operate until such time as the circuits are back in step.

Considering FIGURE 4 more specifically, the serial shift register circuit 20 may be of the same type as that discussed with respect to FIGURE 3. This is shown as a closed timing ring. Similarly, a serial shift register 30 is provided and this may be associated with the second level, or B level, of the buffer circuit. In order to provide the interlock function, a pair of flip-flops FF1 and FF2 are provided, the outputs of these flip-flops being appropriately gated in the gating circuits 34 and 36 to provide a gating signal for a further gating circuit 38. As shown, a signal WA is derived from the reset output of FF1, while a signal WB is obtained from the reset output of FF2. These signals are applied to the correspondingly labeled gate inputs in FIGURE 1. The gating circuit 38 also has applied thereto a stepping function (A) which is adapted to signal the necessary timing desired for the reading and writing operation in the A level of the buffer. A shift signal source 32 is provided for the serial shift register 30 and this signal source 32 is adapted to be stepped by a signal (B) which is related to the desired timing of the reading and writing operations in the B level of the buffer.

In the normal operation of the circuit of FIGURE 4, a timing pulse will be inserted in each of the registers 20 and 30. Further, these timing pulses will normally be so arranged that when a timing pulse in register 20 is in the cores 1 through 4, the timing pulse in the register 30 will be in the cores 5 through 8. When the timing pulse shifts from the core 4 of the register 20, it will set the flip-flop FF1. If, at the same time, the timing pulse in the register 30 shifts from the core 8 back into the core 1, the flip-flop FF2 will be reset. With the flip-flop FF1 set and the flip-flop FF2 reset, the gate 36 will be open and an activating signal will be applied to the input gate leg of the gate 38, so that when the next shift timing function (A) is received at the gate 38, a signal will be applied to the shift signal circuit and the appropriate timing with respect to the register 20 will continue. With the flip-flop FF2 in the reset state, the input WB will be activated and hence the gating sections GB1 to GB4 in FIGURE 1 will be enabled. Conversely, when FF2 is set and FF1 is reset, the input WA is activated and the gates GA1 to GA4 are enabled.

The timing signals for the shift circuit 32 may be applied in a random manner to step the timing pulse through the cores 1 through 4, and as soon as the signal is shifted out of core 4, the flip-flop FF2 will be set. The setting of the flip-flop FF2 will be effective to remove the activating signal from the flip-flop FF2 from the gate 36. This gate will then be closed. Inasmuch as the flip-flop FF1 is still in the set state, it will be impossible for the gating circuit 34 to be open. Thus, the gate 38 will close and the shift signal source 22 will remain inactive. The shift circuit 22 will remain inactive until such time as the flip-flop FF2 is once again reset. It will be apparent that this interlock arrangement will prevent registers 20 and 30 from effecting a reading operation in both levels of the buffer at the same time, or a writing operation of the buffer levels at the same time. Moreover, the signals derived from the interlock arrangement are utilized so that the gating circuits associated with a given buffer level are enabled only when that level is being read out. Further, the system using the buffer matrix of FIGURE 1 may well incorporate system interlocks which will maintain the levels of the buffer in step. In other words, the circuitry of FIGURE 4 is intended to be illustrative only of a very basic form of interlock system, such circuits being capable of refinement in accordance with the overall system requirements.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage without a corresponding use of other features.

Having now described the invention, what is claimed as new and novel and for which it is desired to secure Letters Patent is:

1. A multiple level buffer circuit comprising a data storage matrix formed of a number of data storage elements arranged in rows and columns, said buffer circuit being organized into separate levels each containing a plurality of said storage elements, an output sense amplifier associated with each column, a plurality of sense windings associated with each level of each of said columns, each of said sense windings being coupled to the storage elements in a separate column in a single level of the buffer circuit, gating means connecting said sense windings to the respective output sense amplifiers, means for activating said gating means to sense the outputs from selected ones of said sense windings, a control winding associated with the storage elements in each row, and row selecting means connected to apply switching signals to said storage elements in each row, said row selecting means being adapted to supply switching signals to more than one level of the buffer at the same time.

2. A multiple level buffer circuit comprising a data storage matrix formed of a plurality of data storage elements arranged in rows and columns, said columns having corresponding subdivisions which jointly form a plurality of levels, a separate output sense amplifier associated with each column, a plurality of sense windings associated one each with each column in each level of the buffer circuit, means connecting said sense windings to the respective output sense amplifiers for selectively gating the outputs from said sense windings to said amplifiers, a control winding associated with the storage elements in each row, and row selecting means connected to apply switching signals to said storage elements in each row and in two levels of the buffer circuit at the same time, said switching signals having a first polarity for writing a signal into said row and a second polarity for reading a signal out of said row.

3. A multiple level buffer circuit comprising a data storage matrix formed of a number of data storage elements arranged in rows and columns, said buffer circuit being organized into separate levels each containing a plurality of said storage elements, an output sense amplifier associated with each column, a plurality of sense windings associated one each with each of said columns in each level of said buffer circuit means connecting said sense windings to the respective output sense amplifiers for selectively gating the outputs from said sense windings to said amplifiers, a control winding associated with the storage elements in each row, row selecting means connected to apply switching signals to said storage elements in each row and in more than one level of the buffer circuit at the same time, said switching signals having a first polarity for writing a signal into said row and a second polarity for reading a signal out of said row, and means associated with each column for producing a digit signal having a signal polarity corresponding to said second polarity.

4. A multiple level matrix buffer circuit comprising a plurality of magnetic core storage devices arranged in a plurality of columns and rows, selection lines common to each row and column, a plurality of input signal means connected one each to each of said selection lines common to each column, a plurality of row selection signal means connected one each to each of said selection lines common to each row, a plurality of sense output circuits arranged one each to each column, a plurality of sense lines dividing each column into a plurality of levels, gating means connected to said sense output circuits and said sense lines to selectively gate signals from said sense lines to said sense output circuits and control means alternately activating each gating means in each column.

5. A multiple level matrix buffer circuit comprising a plurality of magnetic core storage devices arranged in a plurality of columns and rows, selection lines common to each row and column, a plurality of input signal means connected one each to each of said selection lines common to each column, a plurality of row selection signal means connected one each to each of said selection lines common to each row, a plurality of sense output circuits arranged one each to each column, a plurality of sense lines dividing each column into a plurality of levels, gating means connected to said sense output circuits and said sense lines to selectively gate signals from said sense lines to said sense output circuits, and sequencing means connected to said row selection signal means to activate one or two of said selection signal means in separate levels at the same time.

6. A buffer for a data processing apparatus comprising a matrix of electrical storage elements arranged in a plurality of rows and columns, said matrix being divided into at least two levels, each containing a plurality of said storage elements, a plurality of column selection lines arranged with one each to each column in the two levels, a plurality of row selection lines arranged with at least one line for each row of said matrix, a plurality of sense lines arranged with one each for each level on each column in that level, a utilization circuit associated with each column, gating means selectively connecting each level sense line to said utilization circuit, and row selection signal producing means connected to said row selection lines, said signal producing means being adapted for simultaneous operation in said two levels.

7. A buffer for a data processing apparatus comprising a matrix of electrical storage elements divided into at least two levels and arranged in a plurality of rows and columns in each level, a plurality of column selection lines arranged with one each to each column in the two levels, a plurality of row selection lines arranged with at least one line for each row of each of said levels, a first signal control means connected to the row selection lines in one of two levels, a second signal control means connected to the row selection lines in the other of said two levels, a plurality of sense lines arranged with one each for each level on each column in that level, a utilization circuit associated with each column, and gating means selectively connecting each level sense line to said utilization circuit.

8. Apparatus as defined in claim 7 wherein said first and second signal control means are adapted to operate simultaneously and in an opposite signal producing sense.

References Cited in the file of this patent

UNITED STATES PATENTS

| | | |
|---|---|---|
| 2,707,267 | Weidenhammer | May 10, 1955 |
| 2,719,965 | Person | Oct. 4, 1955 |
| 2,794,130 | Newhouse | May 28, 1957 |
| 2,840,801 | Beter et al. | June 24, 1958 |
| 2,843,838 | Abbott | July 15, 1958 |
| 2,872,666 | Greenhalgh | Feb. 3, 1959 |
| 2,889,540 | Bauer | June 2, 1959 |
| 2,922,996 | Young | Jan. 26, 1960 |
| 2,928,080 | Auerbach | Mar. 8, 1960 |
| 3,007,141 | Rising et al. | Oct. 31, 1961 |